Patented Aug. 29, 1950

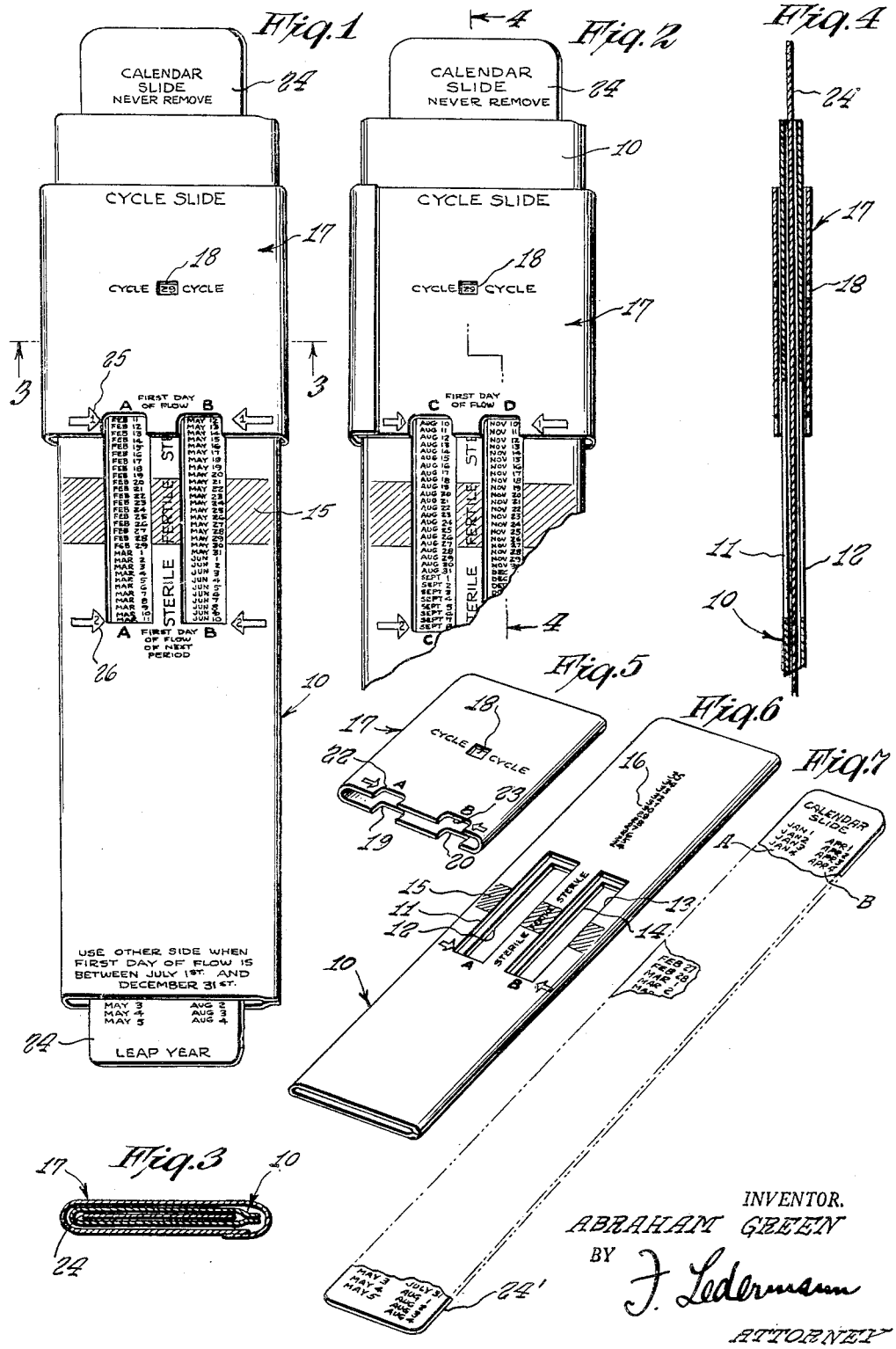

2,520,208

UNITED STATES PATENT OFFICE 2,520,208

STERILITY SLIDE RULE

Abraham Green, New York, N. Y.

Application November 10, 1949, Serial No. 126,469

3 Claims. (Cl. 235—89)

This invention relates to a sterility slide rule.

It is an object of the present invention to provide a sterility slide rule by means of which and upon the simple manipulation of parts, the periods of greatest fertility in women can be determined in an accurate manner and which requires no calculation or mental compilation to determine the exact dates for one woman's cycle in which she is fertile and in which she is sterile.

It is another object of the present invention to provide, on the same slide rule, means whereby the length of the cycle can be readily determined by a simple manipulation of the operable parts in a reverse manner from that which they are used in determining the fertility period.

Other objects of the present invention are to provide a fertility slide rule which is of simple construction, operated by a simple manipulation of the parts, adapted to receive a leap year slide, inexpensive to manufacture, has a minimum number of parts, compact and consumes little space and efficient in operation.

For other objects and for a better understanding of the invention, reference may be had to the following detailed description taken in connection with the accompanying drawing, in which:

Fig. 1 is a plan view of the slide rule embodying the features of the present invention.

Fig. 2 is a fragmentary plan view showing the reverse side of the rule.

Fig. 3 is a transverse sectional view taken on line 3—3 of Fig. 1.

Fig. 4 is a longitudinal sectional view taken on line 4—4 of Fig. 2.

Fig. 5 is a perspective view of the slide.

Fig. 6 is a perspective view of the holder.

Fig. 7 is a perspective view of the calendar slide bearing the days of the month on the reverse sides thereof.

It has been determined that the sperm cannot penetrate the cervical mucus for on the average of ten to fourteen days after the menstrual period. Thereafter, there is a fertile period which lasts for about eight days. During the remainder of the cycle, the cervical mucus is not penetrable by the sperm except during menstruation. With these facts in mind and by a simple manipulation of the slide rule about to be described in detail, the woman, upon knowing the exact length of her menstrual cycle, can set the parts of the slide rule so that the exact dates when fertility starts and ends can be quickly and accurately determined.

Referring now to the figures, 10 represents a long flattened sleeve in the opposite sides of which are elongated windows 11, 12, 13 and 14. These windows lie intermediately the length of the sleeve. Intermediate the length of the opening are darkened indicating areas 15 by the use of which the dates of fertility and the period in which conception can occur are readily determined. Outside of these darkened areas are clear areas which give the sterility periods and the dates of the beginning and ends of these periods. Also on the sleeves are a series of consecutive numbers, as indicated at 16, which gives the various cycle days to which outer slide sleeve 17 can be adjusted. The sleeve 17 has a small window 18 through which the number of days can be determined. The slide sleeve 17 will be adjusted to a given number of days, as for example twenty-nine, as viewed in Figs. 1 and 2. This slide sleeve is notched at its lower end, as indicated at 19 and 20 at one side of the sleeve and at 22 and 23 at the opposite side of the sleeve.

Slidable through the sleeve 10 is a calendar slide 24. This calendar slide is divided into four columns—A, B, C, and D. The column A is used when the first day of flow of each menstrual period occurs between January 1 and March 31. The column B is used when the first day occurs between April 1 and June 30. The column C is used when the first day of flow occurs between July 1 and September 30. The column D is used when the first day of flow occurs between October 1 and December 31. It will be seen that the same calendar slide thus bears the dates for the entire year. If the year is a leap year, a slightly different calendar slide is used. This calendar slide will include the extra day of the year.

In operation, if it be assumed that the first day of flow of the woman under consideration is, as viewed in Fig. 1, on February 11, the procedure will be as follows. The slide 17 is first adjusted to the particular cycle number of the woman. For example, if the cycle is concluded in twenty-nine days, the slide 17 is adjustable to the twenty nine day listing as found in the numbers indicated at 16. This number twenty-nine will appear through the opening 18 of the slide sleeve 17. Thereafter, the calendar slide is moved so that the date of first flow day, or February 11, is adjacent the arrow 25 and within the notch 22. By reading downwardly upon the calendar slide in the A column, it will be found that the first day of fertility will be February 20. This period will last through until February 29 and thereafter the woman will be sterile. As the arrow, as indicated at 26, the date of first flow for the following period can be read. The same procedure is used if the other columns on the calendar slide are used.

To determine the days of the cycle, the current first day of flow is set adjacent arrow 26, then the cycle slide is moved until the arrow 25 is adjacent the first day of flow of the last menstrual period. The cycle is the number that appears through the window 18 of the slide 17.

It should accordingly be apparent that the number of days of the cycle can be readily determined from the rule and also the exact dates of beginning of fertility and the ending of the same. By the same means, the dates of sterility can be determined. As shown in Fig. 2, the different scales C and D are viewed from the opposite side of the rule. It is seen that it is an easy matter for the woman to determine these periods and the exact dates thereof.

The slide shown in Fig. 1 has the February 29 date marked thereon and is the slide that is used on a leap year. The slide shown in Fig. 7, and indicated by the numeral 24', is the slide that is used on other years.

While various changes may be made in the detail construction, it shall be understood that such changes shall be within the spirit and scope of the present invention as defined by the appended claims.

What is claimed is:

1. A sterility and fertility slide rule comprising a flattened sleeve having an elongated window therein, a fertility indicating area being disposed along the opening and the sides thereof, said sleeve having cycle day indications thereupon, a calendar slide adjustable through the sleeve and having date markings thereupon, and a slide sleeve adjustable upon the flattened sleeve and over the opening to locate the slide sleeve such that a reading can be made with relation thereto upon the calendar slide, said slide sleeve having an opening therein through which the number of cycle days can be observed.

2. A sterility and fertility slide rule comprising a flattened sleeve having an elongated window therein, a fertility indicating area being disposed along the opening and the sides thereof, said sleeve having cycle day indications thereupon, a calendar slide adjustable through the sleeve and having date markings thereupon, and a slide sleeve adjustable upon the flattened sleeve and over the opening to locate the slide sleeve such that a reading can be made with relation thereto upon the calendar slide, said slide sleeve having an opening therein through which the number of cycle days can be observed, said slide sleeve having a notch along its lower edge, an arrow indication extending along the inner side of the notch to give indication of the first day of flow.

3. A sterility and fertility slide rule comprising a flattened sleeve having an elongated window therein, a fertility indicating area being disposed along the opening and the sides thereof, said sleeve having cycle day indications thereupon, a calendar slide adjustable through the sleeve and having date markings thereupon, and a slide sleeve adjustable upon the flattened sleeve and over the opening to locate the slide sleeve such that a reading can be made with relation thereto upon the calendar slide, said slide sleeve having an opening therein through which the number of cycle days can be observed, said slide sleeve having a notch along its lower edge, an arrow indication extending along the inner side of the notch to give indication of the first day of flow, and said flattened sleeve having an arrow indication along the lower end of the opening in the flattened sleeve whereby the first day of the flow of the next period can be determined from the calendar slide.

ABRAHAM GREEN.

REFERENCES CITED

The following references are of record in the file of this patent:

UNITED STATES PATENTS

| Number | Name | Date |
| --- | --- | --- |
| 1,983,062 | Anderson | Dec. 4, 1934 |
| 2,161,345 | Gates | June 6, 1939 |
| 2,494,291 | Fay | Jan. 10, 1950 |